(12) United States Patent
Suwald

(10) Patent No.: US 10,579,851 B2
(45) Date of Patent: Mar. 3, 2020

(54) FINGERPRINT PROCESSING SYSTEM AND METHOD

(71) Applicant: NXP B.V., Eindhoven (NL)

(72) Inventor: Thomas Suwald, Hamburg (DE)

(73) Assignee: NXP B. V., Eindhoven (NL)

(*) Notice: Subject to any disclaimer, the term of this patent is extended or adjusted under 35 U.S.C. 154(b) by 6 days.

(21) Appl. No.: 15/887,953

(22) Filed: Feb. 2, 2018

(65) Prior Publication Data
US 2018/0218192 A1    Aug. 2, 2018

(30) Foreign Application Priority Data
Feb. 2, 2017 (EP) .................................. 17154372

(51) Int. Cl.
*G06K 9/00* (2006.01)
*G01D 5/24* (2006.01)
*G06F 21/32* (2013.01)
*G06F 21/34* (2013.01)

(52) U.S. Cl.
CPC ............ *G06K 9/0002* (2013.01); *G01D 5/24* (2013.01); *G06F 21/32* (2013.01); *G06F 21/34* (2013.01)

(58) Field of Classification Search
CPC .... G06K 9/0002; G06K 19/0718; G06K 9/00; G06F 3/044; G06F 21/32; A61B 2562/0214; A61B 2562/046; A61B 5/117; A61B 5/1172; H03K 2217/96074
See application file for complete search history.

(56) References Cited

U.S. PATENT DOCUMENTS

| | | | |
|---|---|---|---|
| 6,114,862 A * | 9/2000 | Tartagni | G01B 7/004 324/661 |
| 8,564,314 B2 | 10/2013 | Shaikh et al. | |
| 8,767,098 B2 | 7/2014 | Solhusvik | |
| 9,152,841 B1 | 10/2015 | Riedijk | |
| 9,195,877 B2 | 11/2015 | Erhart et al. | |

(Continued)

FOREIGN PATENT DOCUMENTS

| | | |
|---|---|---|
| EP | 2 667 156 A1 | 11/2013 |
| WO | 2016/105261 A1 | 6/2016 |
| WO | 2016/160325 A1 | 10/2016 |

OTHER PUBLICATIONS

Extended European Search Report for Patent Appln. No. 17154372.1 (dated May 24, 2017).

(Continued)

*Primary Examiner* — Mekonen T Bekele
*Assistant Examiner* — Michael J Vanchy, Jr.

(57) ABSTRACT

According to a first aspect of the present disclosure, a fingerprint processing system is provided, which comprises: a set of sensor plates; a measurement unit configured to measure one or more capacitances on the sensor plates; a processing unit configured to process the measured capacitances; wherein the measurement unit is configured to concurrently measure capacitances on subsets of the set of sensor plates; wherein the processing unit is configured to process the concurrently measured capacitances. According to a second aspect of the present disclosure, a corresponding method of processing a fingerprint in a fingerprint processing system is conceived. According to a third aspect of the present disclosure, a corresponding computer program is provided.

17 Claims, 7 Drawing Sheets

(56) References Cited

U.S. PATENT DOCUMENTS

| | | | |
|---|---|---|---|
| 9,305,959 B2 | 4/2016 | Bhagavat et al. | |
| 9,317,164 B2 | 4/2016 | Suwald | |
| 2003/0098774 A1* | 5/2003 | Chornenky | G07C 9/00111 340/5.1 |
| 2005/0141263 A1* | 6/2005 | Umeda | G06K 9/0002 365/149 |
| 2006/0158202 A1 | 7/2006 | Umeda et al. | |
| 2006/0197778 A1 | 9/2006 | Peterson et al. | |
| 2013/0177220 A1* | 7/2013 | Erhart | G06K 9/0002 382/124 |
| 2016/0034741 A1 | 2/2016 | Lan et al. | |
| 2018/0330138 A1* | 11/2018 | Suwald | G06K 9/0002 |

OTHER PUBLICATIONS

"Touch Fingerprint Sensor FPC1020, high quality robust fingerprint sensor with new thick, hard and scratch resistant coating—FPC1020", Fingerprints, 3 pgs., retrieved from internet archive Feb. 2, 2018 https://web.archive.org/web/20160314150223/https://www.fingerprints.com/products/touch_sensor/fpc1020/ (Mar. 14, 2016).

* cited by examiner

FINGERPRINT PROCESSING SYSTEM AND METHOD

CROSS-REFERENCE TO RELATED APPLICATIONS

This application claims the priority under 35 U.S.C. § 119 of European patent application no. 17154372.1, filed on Feb. 2, 2017, the contents of which are incorporated by reference herein.

FIELD

The present disclosure relates to a fingerprint processing system. Furthermore, the present disclosure relates to a corresponding fingerprint processing method and to a corresponding computer program.

BACKGROUND

Today, many electronic devices and systems require a form of user authentication. For example, in a payment system, a fingerprint verification device may be used to initiate a payment and to authenticate a user. The fingerprint verification device may for example take the form of, or be embedded in, a smart card. More specifically, in addition to conventional user authentication via a personal identification number (PIN), a smart card may also include a fingerprint sensor for capturing the user's fingerprint. In that case, the captured fingerprint may be used to ascertain that the smart card is presented to a terminal by its rightful owner, for example. However, it may difficult to implement a fingerprint sensor with a high sensitivity in a fingerprint verification device of the kind set forth.

SUMMARY

According to a first aspect of the present disclosure, a fingerprint processing system is provided, which comprises: a set of sensor plates; a measurement unit configured to measure one or more capacitances on the sensor plates; a processing unit configured to process the measured capacitances; wherein the measurement unit is configured to concurrently measure capacitances on subsets of the set of sensor plates; wherein the processing unit is configured to process the concurrently measured capacitances.

In one or more embodiments, the processing unit is further configured to derive a capacitance on one or more individual sensor plates from said concurrently measured capacitances. In one or more embodiments, said subsets are mutually different subsets of the set of sensor plates.

In one or more embodiments, each subset comprises (n−1) sensor plates, wherein n represents the number of sensor plates in the set of sensor plates.

In one or more embodiments, the measurement unit is configured to sequentially measure the capacitances on n mutually different subsets of the set of sensor plates.

In one or more embodiments, the measurement unit comprises a switched capacitor integrator.

In one or more embodiments, the set of sensor plates corresponds to a row in an array of sensor plates.

In one or more embodiments, the set of sensor plates corresponds to multiple rows in an array of sensor plates.

In one or more embodiments, the array of sensor plates is controlled by configurable shift registers.

In one or more embodiments, the set of sensor plates corresponds to an image or to multiple images of a fingerprint.

In one or more embodiments, the processing unit is a microcontroller.

In one or more embodiments, the processing unit is further configured to derive, from the capacitance on an individual sensor plate, the distance between a surface of the finger and said sensor plate, and to use said distance for generating a fingerprint image.

In one or more embodiments, a fingerprint verification device, in particular a smart card, comprises a fingerprint processing system of the kind set forth.

According to a second aspect of the present disclosure, a method of processing a fingerprint in a fingerprint processing system is conceived, said system comprising a set of sensor plates, a measurement unit configured to measure one or more capacitances on the sensor plates, and a processing unit configured to process the measured capacitances, the method comprising: the measurement unit concurrently measures capacitances on subsets of the set of sensor plates; the processing unit processes the concurrently measured capacitances.

According to a third aspect of the present disclosure, a computer program is provided, the program comprising non-transient instructions which, when executed, carry out or control the steps of a method of the kind set forth.

DESCRIPTION OF DRAWINGS

Embodiments will be described in more detail with reference to the appended drawings, in which.

DESCRIPTION OF EMBODIMENTS

Figure 1A:
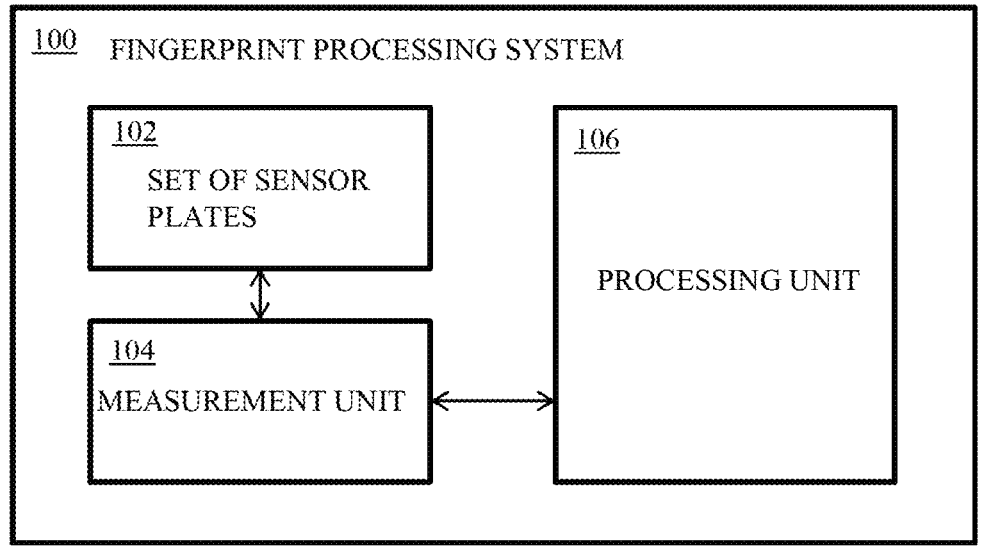
FIG. 1A shows an illustrative embodiment of a fingerprint processing system.

FIG. 1A shows an illustrative embodiment of a fingerprint processing system 100. The fingerprint processing system 100 comprises a set of sensor plates 102 operatively coupled to a measurement unit 104. Furthermore, the fingerprint processing system 100 comprises a processing unit 106 operatively coupled to the measurement unit 104. In accordance with the present disclosure, the measurement unit 104 is configured to measure one or more capacitances on the sensor plates 102. In particular, a measurable capacitance may develop on a sensor plate when a voltage is applied to said plate and an external object, such as a finger, comes into proximity of said plate. In this scenario, the sensor plate may act as an electrode and the external object may act as a counter electrode. More specifically, in accordance with the present disclosure, the measurement unit 104 is configured to concurrently measure capacitances on subsets of the set of sensor plates 102. Furthermore, the fingerprint processing system 100 comprises a processing unit 106 operatively coupled to the measurement unit 104. The processing unit 106 is configured to process measured capacitances, in particular concurrently measured capacitances. By concurrently measuring capacitances on subsets of the set of sensor plates 102, the sensitivity of a fingerprint sensor may be increased.

Figure 1B:
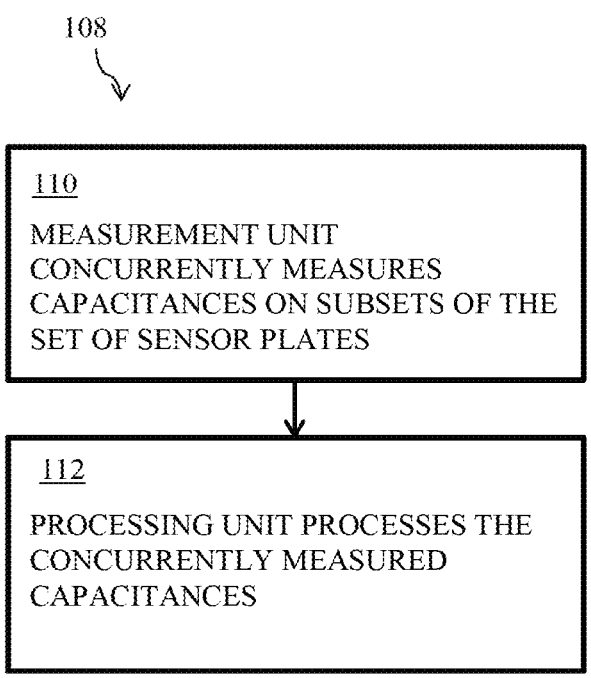
FIG. 1B shows an illustrative embodiment of a fingerprint processing method.

FIG. 1B shows an illustrative embodiment of a corresponding fingerprint processing method 108. The method 108 comprises, at 110, that the measurement unit 104 concurrently measures capacitances on subsets of the set of sensor plates 102. Furthermore, the method 108 comprises, at 112, that the processing unit 106 processes the capacitances that were concurrently measured by the measurement unit 104. As mentioned above, by concurrently measuring capacitances on subsets of the set of sensor plates 102, the sensitivity of a fingerprint sensor may be increased.

In particular, the integration of a fingerprint sensor into smart cards may require costly manufacturing processes, mainly due to the requirement to expose a coated sensing surface to a cardholder's finger. In order to meet this requirement a fingerprint sensor may need a complex module packaging, so as to ensure that the sensor is integrated into a card in such a way that it withstands mechanical stress. Quality requirements of this kind may be prescribed by payment network operators, for example. Smart cards often comprise a substrate; the fingerprint sensor may be connected to one side of the substrate, while the finger touches the other side of the substrate. Unfortunately this substrate, which may act as an insulation material, has a certain minimum thickness. The presence of insulation material between a cardholder's finger and the active area of a sensor may lead to an attenuation of the measurable effects (e.g., an attenuation of the capacitance change on sensor plates) when a finger comes into proximity of the sensor. This, in turn, may negatively affect the sensitivity of the fingerprint sensor. Although a reduced sensitivity may be corrected by softwareimplemented techniques (e.g., correlation, filtering and deconvolution), these corrections consume power and require a sufficiently large memory. These correction techniques are therefore less suitable for resource-constrained devices, such as smart cards. As explained herein, the presently disclosed system and method may achieve an increased sensitivity without applying the aforementioned correction techniques.

Figure 2:
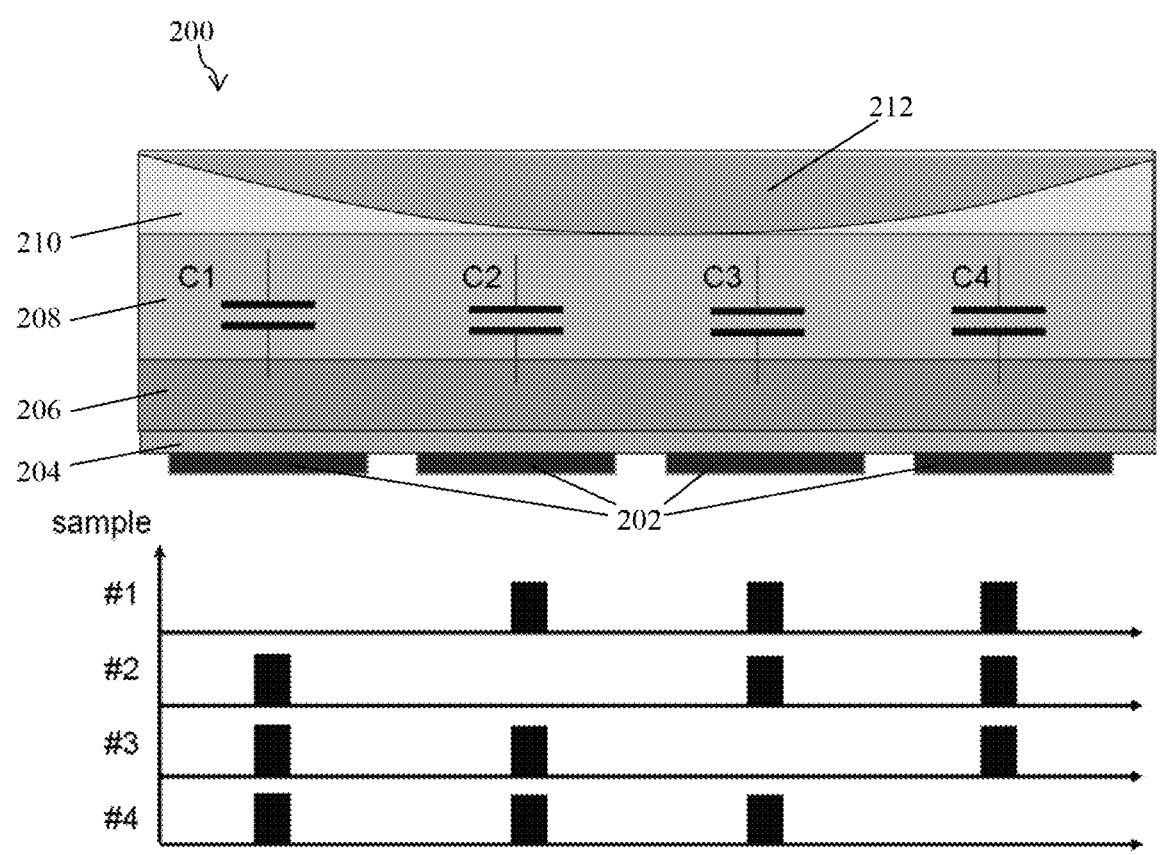
FIG. 2 shows another illustrative embodiment of a fingerprint processing system.

FIG. 2 shows another illustrative embodiment of a fingerprint processing system 200. The fingerprint sensing system 200 comprises a set of sensor plates 202 coupled to a nitride layer 204. The nitride layer 204 is coupled to a glue-layer 206. The glue-layer 206 is coupled to a substrate 208. The fingerprint system 200 may form part of a smart card, for example. The substrate 208 may be touched by a finger 212. It is noted that more insulating layers may be present between the finger 212 and the nitride layer 204. Furthermore, a coating may be present between the finger 212 and the substrate 208. Furthermore, it is noted that the term "finger" includes all parts of a finger, such as the finger's papillae. Thus, more precisely, the substrate 208 (or the coating, as the case may be) may be touched by the finger's ridges. At locations where the finger 212 does not touch the substrate 208, an air gap 210 may exist. A measurement unit (not shown) may measure the capacitances present on the sensor plates 202 in order to detect the touching of the substrate 208 by the finger 212 at the specific locations of the plates 202. More specifically, when the substrate 208 is touched at a specific location, the capacitance on the sensor plate 202 at that location will change since the finger acts as a counter electrode, and the air gap 210 is absent or small at that location. Thus, the variance in the air gap between the finger's surface and the sensor may indicate the depth of the fingerprint's papillae. By registering and processing the changed capacitances, an image of the fingerprint may be formed.

As shown in FIG. 2, additional layers are often present between the sensor plates 202 and the surface of the finger 212: a nitride passivation layer 204 having a thickness of e.g. 1.5 µm that is applied during wafer processing of the sensor, a glue layer 206 of e.g. 10-25 µm that may be applied after wafer production by dispensing, and a substrate layer 208 of 50-150 µm which may be formed by a thermoplastic material such as PET, PVC, polycarbonate or PI. As mentioned above, more layers may be present between the sensor plates 202 and the surface of the finger 212. The average valley depth of a human finger may be assumed to be 20 µm. To the various layers with various materials various dielectric constants may be assigned. As a simplification, in the following description the indicated thicknesses are corrected by application of the related dielectric constants, so as to yield a distance corresponding to an air gap with similar capacitive properties. For instance, a dielectric constant of 3 would correct a 150 µm thick polycarbonate substrate to 50 µm. Assuming an average dielectric constant of e.g. 3 and the thicknesses as indicated above, a layer stack of 2 µm nitride, 10 µm of glue-layer and 150 µm of substrate yields an additional, virtual air gap of 54 µm. As the relationship between capacitance and air gap is reciprocal, the impact of an additional air gap of 54 µm is significant. From an electrical perspective the additional air gap reduces the overall capacitance, yielding an attenuated voltage after capacitance-to-voltage conversion. This, in turn, reduces the sensitivity of the sensor.

In accordance with the present disclosure, capacitances on subsets of the set of sensor plates 202 are measured concurrently, as shown in the lower part of FIG. 2. For instance, in a first time slot (sample number 1) the capacitances C2, C3, and C4 are measured. In a second time slot (sample number 2) the capacitances C1, C3, and C4 are measured. In a third time slot (sample number 3) the capacitances C1, C2, and C4 are measured. In a fourth time slot (sample number 4) the capacitances C1, C2, and C3 are measured. Thus, instead of sequentially measuring the individual capacitances C1, C2, C3, and C4, capacitances {C2, C3, C4} are measured concurrently, capacitances {C1, C3, C4} are measured concurrently, capacitances {C1, C2, C4}; are measured concurrently, and capacitances {C1, C2, C3} are measured concurrently. In this way, the sensitivity of the sensor may be increased. In particular, the size of a sensor plate determines, among other parameters, the capacitance between said sensor plate and the finger's surface. The capacitance of such a sensor plate may e.g. be in the range of 0.5 fF to 20 fF when the finger's surface is in proximity. By concurrently measuring the capacitances on subsets of the sensor plates, a "virtual sensor plate" is created, which has a larger size than the individual sensor plates 202. The higher capacitance measured on this "virtual sensor plate" (i.e., higher than the individual capacitances on the sensor plates 202) mitigates the aforementioned attenuation of the measurable effects. This, in turn, increases the sensitivity of the sensor.

In one or more embodiments, the processing unit is further configured to derive a capacitance on one or more individual sensor plates from the concurrently measured capacitances. For example, the processing unit may perform a calculation that derives the individual capacitances on the sensor plates from the capacitances measured on the subsets. In this way, the fingerprint sensor may be sufficiently sensitive, and at the same time it may still produce a high-resolution fingerprint image. An example of such a calculation is described with reference to FIG. 4. In a practical and efficient implementation, the subsets are mutually different subsets of the set of sensor plates. Thereby, the calculation of the individual capacitances may be simplified. Furthermore, in a practical and efficient implementation, each subset comprises (n−1) sensor plates (n represents the total number of sensor plates in the set), and the measurement unit is configured to sequentially measure the capacitances on n mutually different subsets of the set of sensor plates. This may further facilitate the calculation of the individual capacitances on the sensor plates in the set. Furthermore, in a practical and efficient implementation, n is a power of two plus one (n=2·x+1). In that case, post-processing may be realized by binary shift operations, which have the advantage of being fast.

Figure 3:
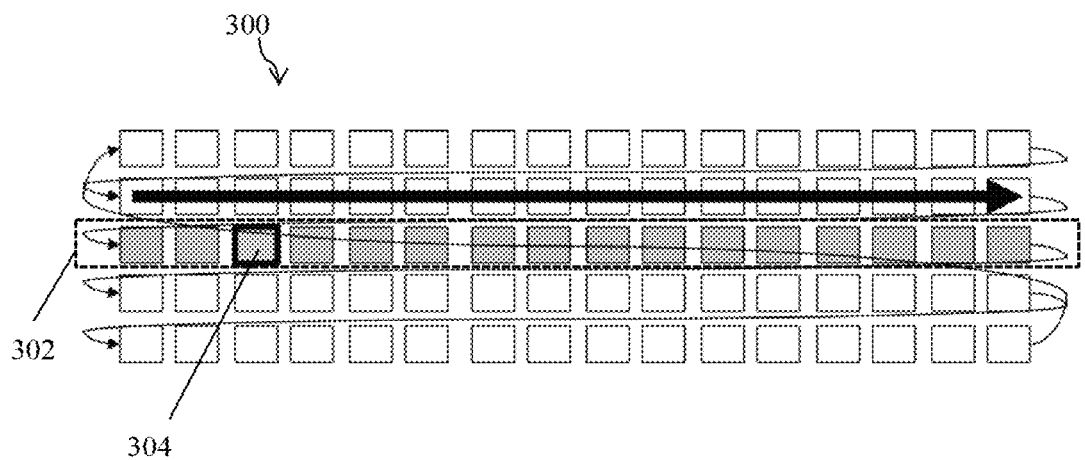
FIG. 3 shows an illustrative embodiment of an array of sensor plates.

FIG. 3 shows an illustrative embodiment of an array 300 of sensor plates. The array 300 comprises a plurality of sensor plates organized in rows and columns. For example, row 302 contains a plurality of sensor plates. In this row 302, the capacitances of all but one sensor plate are measured concurrently. For instance, the capacitance of sensor plate 304 may not be measured, while the capacitances of the other sensor plates in row 302 are measured concurrently. In other words, sensor plate 304 is not evaluated, while the other sensor plates in row 302 are evaluated concurrently. For a fingerprint sensor it may be assumed that the fingerprint does not vary over time while it is scanned. tinder this assumption the line scanning sequence shown in FIG. 3 may be applied. In this example, the set of sensor plates is row 302 contains 16 sensor plates (so n=16), and the subset of sensor plates that is evaluated contains 15 sensor plates (n−1). As mentioned above, this results in a practical and efficient implementation. The image may be scanned line by line (i.e., row by row). In total as many sum evaluations may be applied as the number of sensor plates contained in row 302. In other words, n mutually different subsets of the set of sensor plates may be evaluated sequentially. The sensor area is then a multiple of (n−1) instead of the area of a single sensor plate; thus the output signal is also a multiple compared to signal provided by a single sensor plate.

Figure 4:
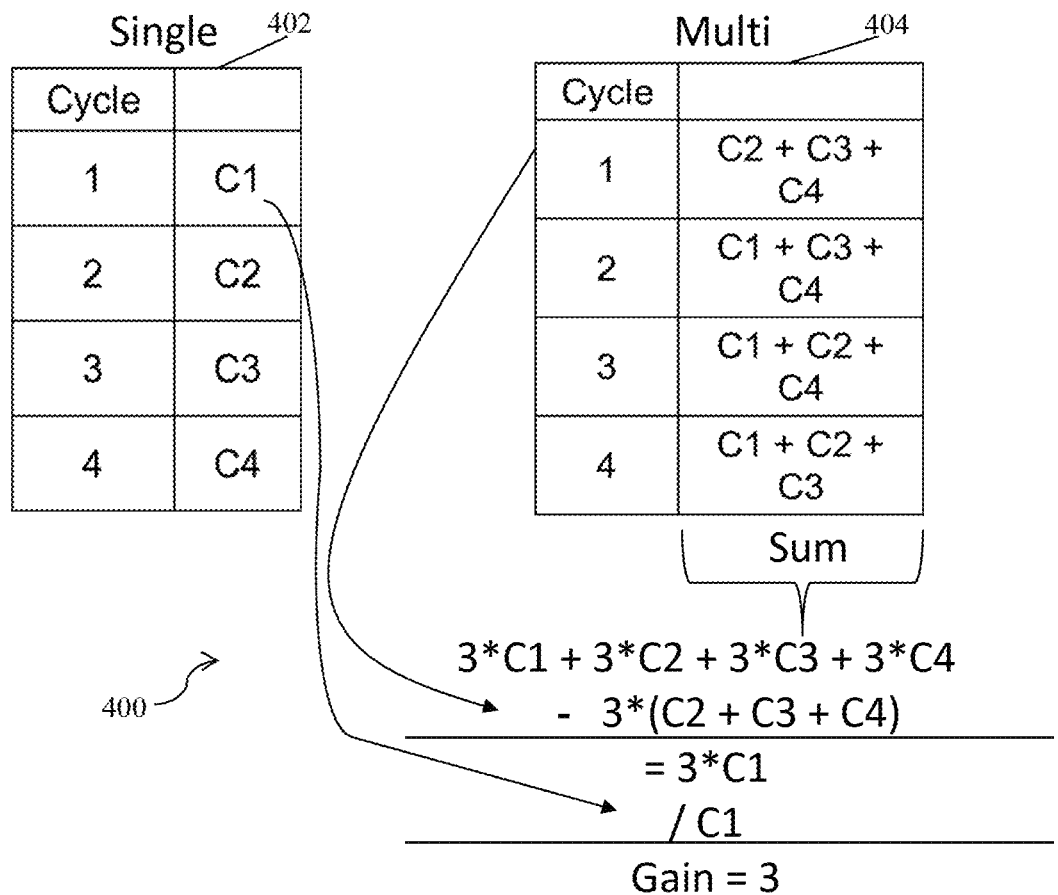
FIG. 4 shows an illustrative embodiment of a sampling principle.

FIG. 4 shows an illustrative embodiment of a sampling principle 400 in accordance with the present disclosure. The left side of FIG. 4 shows the evaluation 402 of single sensor plates. In other words, the left side of FIG. 4 shows how individual capacitances C1, C2, C3, and C4 are measured sequentially. For example, the individual capacitances may be measured in subsequent cycles or sampling steps. The right side of FIG. 4 shows the concurrent evaluation 404 of sensor plates in accordance with the present disclosure. In other words, the right side of FIG. 4 shows how capacitances on subsets of sensor plates are measured concurrently. More specifically, in a first cycle or sampling step capacitances {C2, C3, C4} are measured concurrently, in a second cycle or sampling step capacitances {C1, C3, C4} are measured concurrently, in a third cycle or sampling step capacitances {C1, C2, C4}, are measured concurrently, and in a fourth cycle or sampling step capacitances {C1 C2, C3} are measured concurrently.

The sampling principle 400 shown in FIG. 4 applies to a set that comprises four sensor plates. Due to that fact that in every step one sensor plate is not evaluated the sum of all sum samples amounts to (4−1)=3 multiplied by the sum of all capacitances. It is noted that the term "sum sample" refers to the concurrently measured capacitances in a particular step. By subtracting (4−1)=3 multiplied by one sum sample (e.g. C2+C3+C4, as shown in FIG. 4) from the sum of all sum samples the value of (4−1)=3 multiplied by an individual capacitance is obtained (e.g. 3·C3, as shown in FIG. 4). By dividing this value by (4−1)=3, the value of the individual capacitance (C3) is obtained. Thus, specifically, the value of the individual capacitance that is not included in the sample sum under consideration is obtained. The gain factor in this example is (4−1)=3. For a large set of sensor plates (e.g., n=96) the gain factor is significant (96−1)=95. Thus, generally speaking, the gain factor is (n−1). This sampling principle is not limited to a single line or row; it may also be applied to a whole image or to multiple images as long as the fingerprint images do not vary during a sampling period. Furthermore, it is noted that the sampling principle is not limited to sampling exactly n−1 samples in case of n sensor plates in a line or a row.

Figure 5:
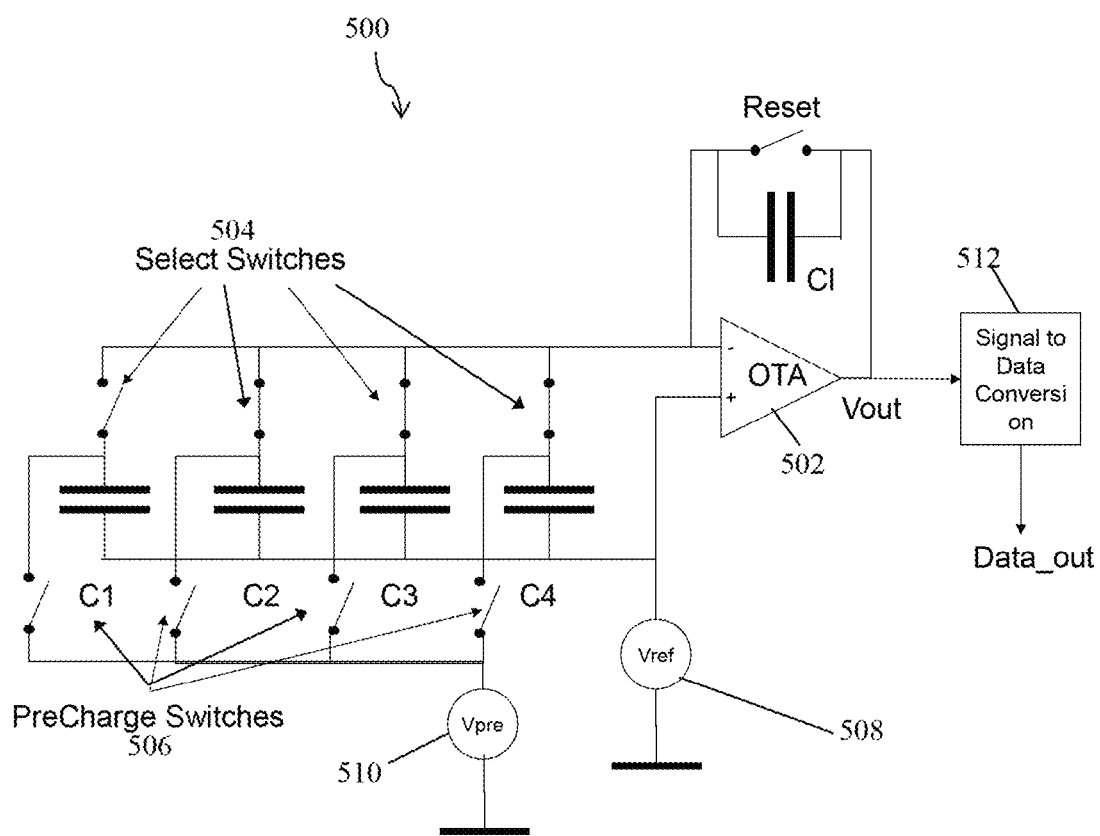
FIG. 5 shows an illustrative embodiment of a switched capacitor integrator.

FIG. 5 shows an illustrative embodiment of a switched capacitor integrator 500. In particular, in one or more embodiments, the measurement unit comprises the switched capacitor integrator 500. The switched capacitor integrator 500 facilitates the implementation of the sampling principle illustrated in FIG. 4. The switched capacitor integrator 500 comprises an operational transconductance amplifier (OTA) 502, select switches 504, pre-charge switches 506, a reference voltage source 508, a pre-charge voltage source 510, and a signal-to-data conversion unit 512. In particular, the creation of the sum samples is realized by the switched capacitor integrator 500. The select switches 504 facilitate the selection of sensor plates that should contribute to a sum sample in a given cycle or sampling step.

Figure 6:
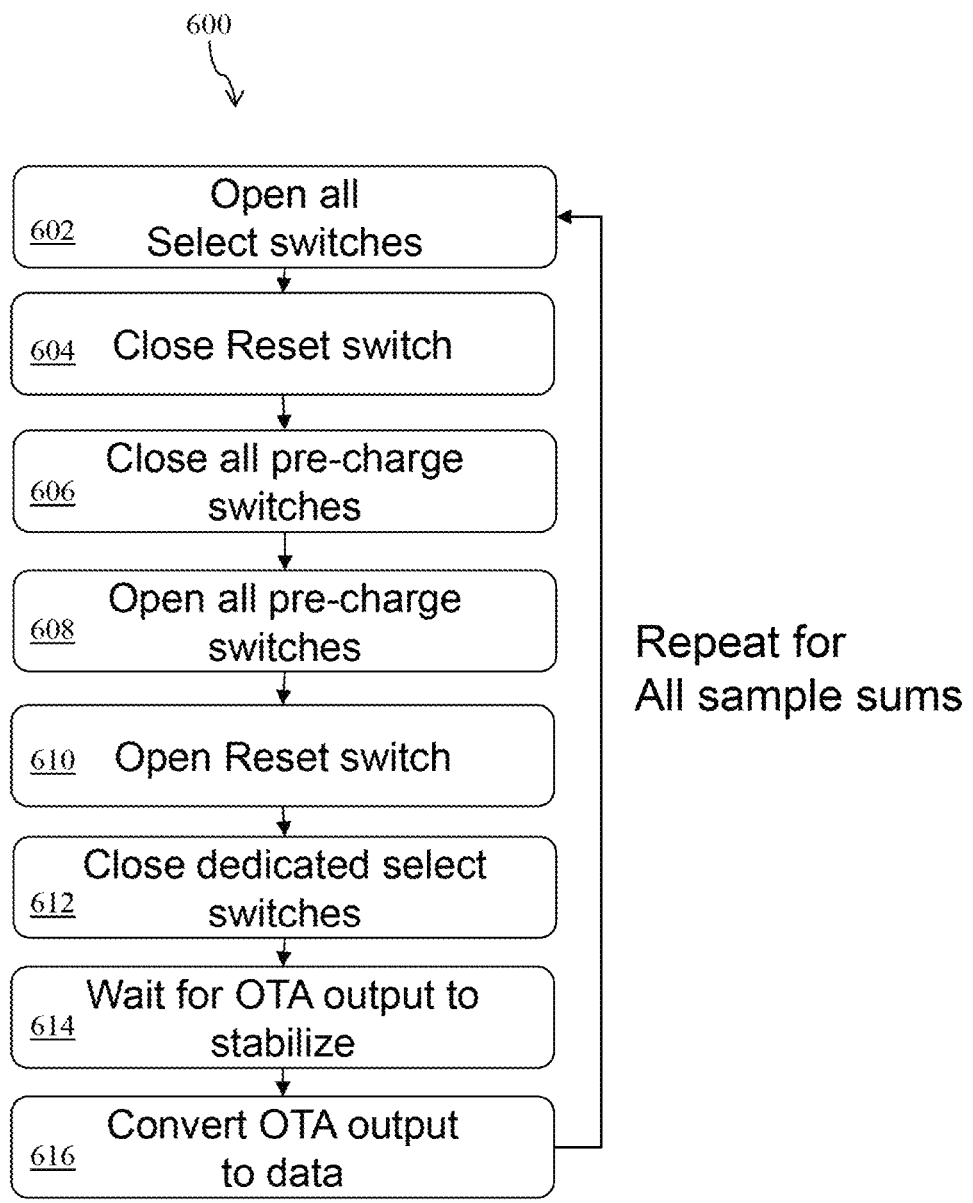
FIG. 6 shows an illustrative embodiment of an operation of a switched capacitor integrator.

FIG. 6 shows an illustrative embodiment of an operation 600 of a switched capacitor integrator. The operation 600 comprises the following steps. At 602, all select switches are opened. At 604, the reset switch is closed. At 606, all pre-charge switches are closed. At 610, the reset switch is opened. At 612, dedicated select switches are closed (i.e., the select switches associated with the particular sensor plates in the subset under evaluation). At 614, the OTA output stabilizes during a waiting period. At 616, the OTA output is converted to data. The steps 602 to 616 are repeated for all other sample sums (i.e., for all other subsets that will be evaluated).

In particular, the sequence starts with opening all select switches at 602 and thus preparing to set the initial conditions for all sensor plates. Then the reset switch is closed at 604 to reset the integration capacitor and reset the inverting input node of the OTA to the reference voltage Vref. Then all pre-charge switches are closed at 606, so that all sensor plates are pre-charged to the pre-charge voltage Vpre (which may be 0, for example). Then all pre-charge switches are opened again at 608. Then the reset switch may be opened at 610 to prepare the readout cycle. Then all select switches associated with the sensor plates in the subset under evaluation are closed at 612. As long as the pre-charge voltage Vpre deviates from the reference voltage Vref the OTA provides a current through the integration capacitor C1 (shown in FIG. 5). This charges all sensor plates in the subset until their voltage is equal to the reference voltage Vref. Once the OTA output has stabilized at the end of the waiting period 614, the OTA may provide the charge collected by the integration capacitor C1, which is indicative of the capacitance sum of all sensor plates connected to the inverted OTA input (i.e., the sensor plates in the subset under evaluation. A successive signal-to-data converter converts the OTA output into machine readable format at 616.

Figure 7:
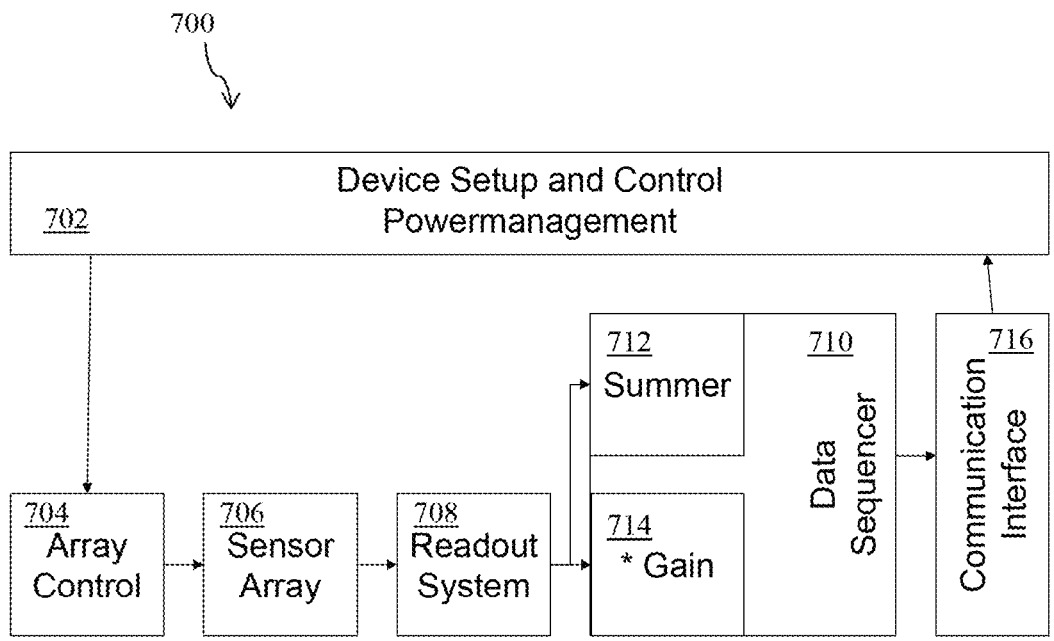
FIG. 7 shows an illustrative embodiment of a sensor unit.

FIG. 7 shows an illustrative embodiment of a sensor unit 700. The sensor unit 700 comprises a device setup/control and power management block 702, an array control block 704, a sensor array 706, a readout system 708, a data sequencer 710, and a communication interface 716. The data sequencer 710 comprises a summer 712 and a gain factor multiplier 714. In particular, the sensor array 706 comprises a plurality of sensor plates of the kind set forth. Furthermore, the readout system 708 may comprise a switched capacitor integrator as shown in FIG. 5, which operates as shown in FIG. 6. More specifically, a device setup; control circuit comprised in block 702 may be configured to drive the array control block 704, such that a fingerprint image may be sampled line by line, for example. The readout system 708 may provide a series of sum samples that may be summed by a separate summer 712 and that may be multiplied concurrently by the gain factor by the gain factor multiplier 714, in order to simplify consecutive processing. Both the individual sum samples multiplied by the gain factor and the total sum of all sum samples may be communicated through the communication interface 716 to a computing device (not shown) for subsequent calculation of the individual and amplified capacitances. It is noted that the array control block 704 may be may be implemented using configurable shift registers. In that case, predefined loading patterns may control these shift registers, so as to easily realize a desired scanning sequence.

Figure 8:
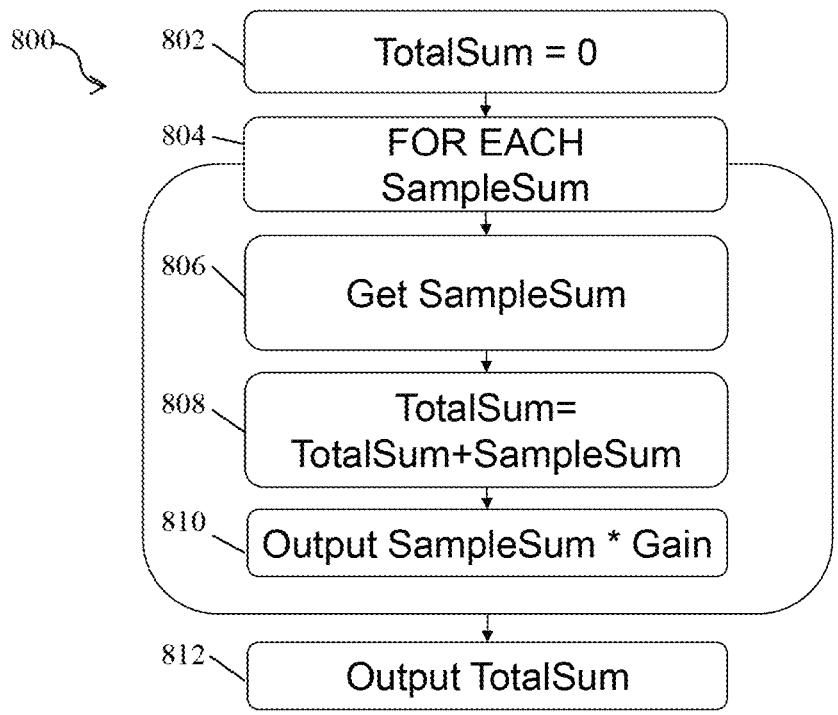
FIG. 8 shows an illustrative embodiment of data sequencing.

FIG. 8 shows an illustrative embodiment of data sequencing 800. The data sequencing 800 may be carried out by the data sequencer 710 shown in FIG. 7. The data sequencing comprises, at 802, initializing a variable TotalSum with the value 0, and then entering a loop 804 that is executed for each sample sum. The loop 804 comprises, at 806, obtaining a sample sum value from the readout system 708, at 808, adding the obtained sample sum value to the variable TotalSum, and, at 810, outputting the sample sum value multiplied by the gain factor. At 812, the value of variable TotalSum is output to the communication interface 716.

Figure 9:
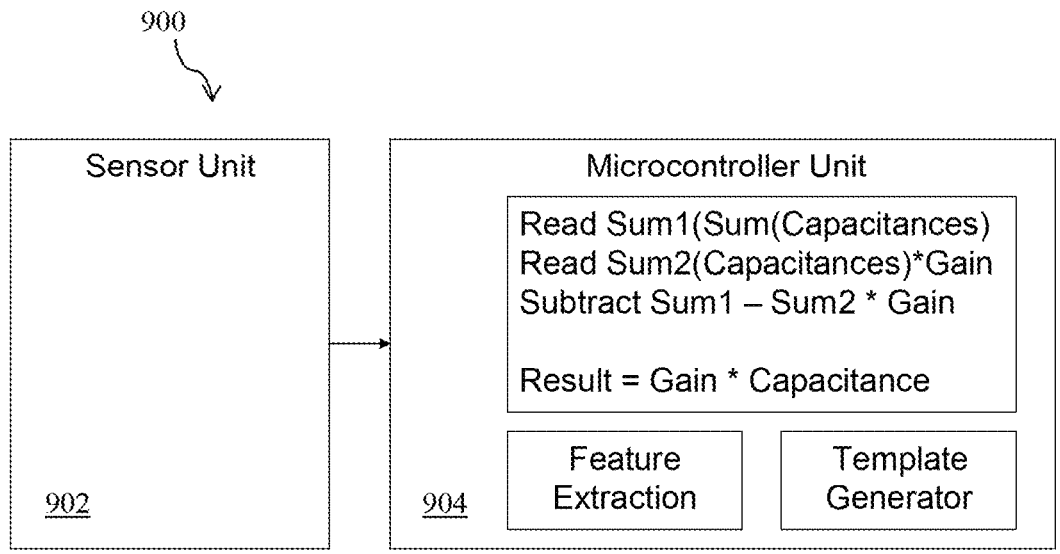
FIG. 9 shows a further illustrative embodiment of a fingerprint processing system.

FIG. 9 shows a further illustrative embodiment of a fingerprint processing system 900. The fingerprint processing system 900 comprises a sensor unit 902 that is operatively coupled to a microcontroller unit 904. The sensor unit 902 may for example be the same as the sensor unit 700 shown in FIG. 7. Furthermore, the microcontroller unit 904 may embody the presently disclosed processing unit. The microcontroller unit 904 may thus process the concurrently measured capacitances on the different subsets of the set of sensor plates present in the sensor unit 902. In addition, the microcontroller 904 may contain a fingerprint feature extraction unit and a fingerprint template generator (i.e., a generator providing a description of identified minutiae in a list format). In particular, in one or more embodiments, the microcontroller unit 904 may derive, from the calculated capacitance on an individual sensor plate at a particular location, the distance between a surface of the finger and said sensor plate, and to use said distance for generating a fingerprint image. That is to say, fingerprint features (e.g., minutiae) may be extracted from a plurality of derived distances at different locations in a sensor array. The extracted fingerprint features may be used to create a fingerprint template that can be compared to a stored reference template, with the purpose of authenticating a user, for example.

In operation, the microcontroller unit 900 may be configured to receive the sum samples and the total sample sum from the sensor unit 902. The microcontroller unit 900 may also perform subtractions to derive individual capacitances of specific sensor plates. The derived individual capacitance values may be processed by the microprocessor unit 904 in order to derive the corresponding fingerprint valley depths (i.e., the distances between the respective sensor plates and the finger). The obtained valley depths may be processed by the feature extraction unit to provide a set of fingerprint features, which may be formatted by the template generator so as to generate a fingerprint template which complies with the input requirements of a subsequent matcher.

Figure 10:
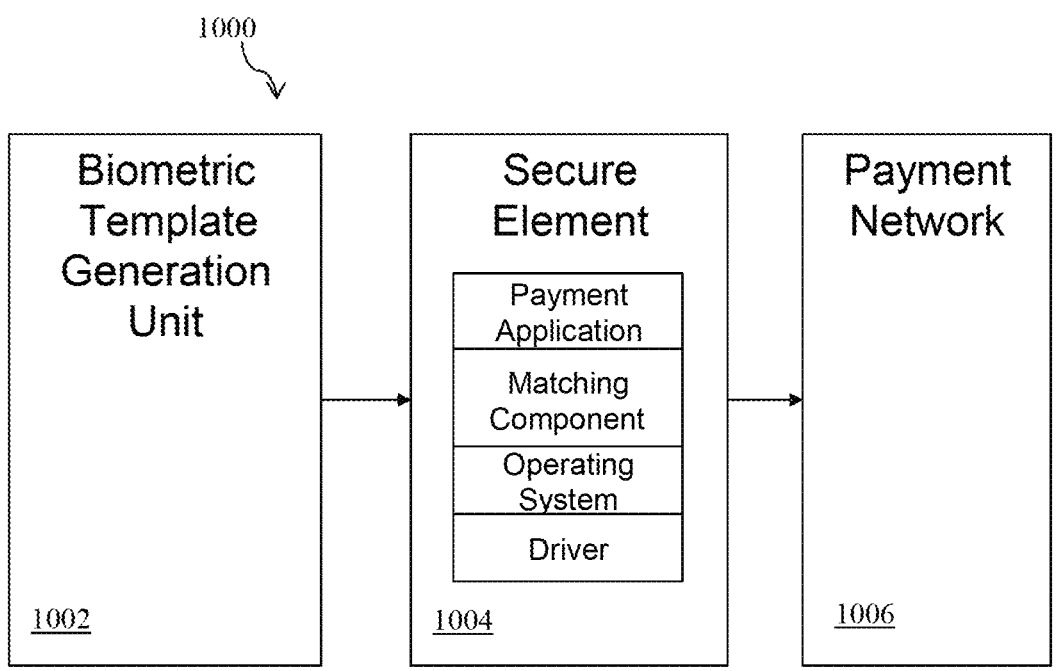
FIG. 10 shows an illustrative embodiment of a fingerprint verification system.

FIG. 10 shows an illustrative embodiment of a fingerprint verification system 1000. The system 1000 comprises a biometric template generation unit 1002 (e.g., the fingerprint template generator of the microcontroller 904) operatively coupled to a secure element 1004. The secure element 1004 may for example be a chip embedded in a smart card, more specifically a tamper-resistant integrated circuit with installed or pre-installed smartcard-grade applications, for instance payment applications, which have a prescribed functionality and a prescribed level of security. Furthermore, the secure element 1004 may implement security functions, such as cryptographic functions and authentication functions. In this example, the secure element 1004 comprises a payment application, a fingerprint matching component, an operating system and a driver. The fingerprint matching component may compare a fingerprint template provided by the biometric template generation 1002 with a stored reference template. Furthermore, the system 1000 comprises a payment network 1006 operatively coupled to the secure element 1004, for example through an interface unit (not shown) of a smart card.

In particular, a fingerprint template provided by the biometric template generation unit 1002 may represent the fingerprint of a cardholder. The template may be provided through a communication channel to the secure element 1004. Said secure element 1004 may be configured to match the received template against a stored reference template that may be linked to the cardholder's identity. The fingerprint template generation may be initiated by a payment applet executed under control of an operating system that is implemented on the secure element 1004. In case of a positive match between the received template and the stored reference template, a payment transaction may be authorized. For that purpose the secure element 1004 may be connected to the payment network 1006. If a payment transaction requires authentication, the payment applet executed by the secure element 1004 may request the fingerprint verification.

The systems and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 fingerprint processing system
102 set of sensor plates
104 measurement unit
106 processing unit
108 fingerprint processing method
110 measurement unit concurrently measures capacitances on subsets of the set of sensor plates
112 processing unit processes the concurrently measured capacitances
200 fingerprint processing system
202 sensor plates
204 nitride layer
206 glue layer
208 substrate
210 air gap
212 finger
300 array of sensor plates
302 row in array of sensor plates
304 not-evaluated sensor plate
400 sampling principle
402 evaluation of single sensor plates
404 concurrent evaluation of sensor plates
500 switched capacitor integrator
502 operational transconductance amplifier (OTA)
504 select switches
506 pre-charge switches
508 reference voltage source
510 pre-charge voltage source
512 signal-to-data conversion unit
600 operation of switched capacitor integrator
602 open all select switches
604 close reset switch
606 close all pre-charge switches
608 open all pre-charge switches
610 open reset switch
612 close dedicated select switches
614 wait for OTA output to stabilize
616 convert OTA output to data
700 sensor unit
702 device setup and control, power management
704 array control 706 sensor array
708 readout system
710 data sequencer
712 summer
714 gain factor multiplier
716 communication interface
800 data sequencing
802 TotalSum=0
804 For Each SampleSum
806 Get SampleSum
808 TotalSum=TotalSum+SampleSum
810 Output SampleSum*Gain
812 Output TotalSum
900 fingerprint processing system
902 sensor unit
904 microcontroller unit
1000 fingerprint verification system
1002 biometric template generation unit
1004 secure element
1006 payment network

The invention claimed is:

1. A fingerprint processing system, comprising:
a set of sensor plates;
a measurement unit configured to measure one or more capacitances on the sensor plates;
a processing unit configured to process the measured capacitances;
wherein the measurement unit is configured to concurrently measure capacitances on mutually different subsets of the set of sensor plates;
wherein each mutually different subset of the set of sensor plates comprises (n−1) sensor plates, wherein n represents the number of sensor plates in the set of sensor plates, and wherein the measurement unit is configured to sequentially measure the capacitances on n mutually different subsets of the set of sensor plates, wherein each mutually different subset of the n mutually different subsets is a unique set of sensor plates; and
wherein the processing unit is further configured to derive a capacitance on each one of the n individual sensor plates from said concurrently measured capacitances that are sequentially measured on the n mutually different subsets of the set of sensor plates;
wherein deriving a capacitance on each one of the n individual sensor plates from said concurrently measured capacitances comprises:
summing the capacitances of the n mutually different subsets; and
utilizing a gain factor of n−1 to calculate the capacitance of each one of the n individual sensor plates from said concurrently measured capacitances.

2. The system of claim 1, wherein the measurement unit comprises a switched capacitor integrator.

3. The system of claim 1, wherein the set of sensor plates corresponds to a row in an array of sensor plates.

4. The system of claim 3, wherein the array of sensor plates is controlled by configurable shift registers.

5. The system of claim 1, wherein the set of sensor plates corresponds to multiple rows in an array of sensor plates.

6. The system of claim 1, wherein the set of sensor plates corresponds to an image or to multiple images of a fingerprint.

7. The system of claim 1, wherein the processing unit is a microcontroller.

8. The system of claim 1, wherein the processing unit is further configured to derive, from the capacitance on an individual sensor plate, the distance between a surface of the finger and said sensor plate, and to use said distance for generating a fingerprint image.

9. A fingerprint verification device, in particular a smart card, comprising the fingerprint processing system of claim 1.

10. The system of claim 1, wherein n is a power of two plus one.

11. The system of claim 10, wherein the processing unit is configured to perform binary shift operations to derive a capacitance on one or more individual sensor plates from said concurrently measured capacitances.

12. The system of claim 1, utilizing a gain factor of n−1 to calculate the capacitance of each one of the n individual sensor plates from said concurrently measured capacitances comprises:
multiplying the sum of capacitances of one of the n mutually different subsets by n−1 to generate a subtraction value, wherein the particular one of the n mutually different subsets that is used to generate the subtraction value does not include a capacitance measurement from a first sensor plate;
obtaining the difference between the sum of the capacitance of the n mutually different subsets and the subtraction value; and
dividing the difference between the sum of the capacitance of the n mutually different subsets and the subtraction value by n−1 to obtain the capacitance of the first sensor plate.

13. A method of processing a fingerprint in a fingerprint processing system, said system comprising a set of sensor plates, a measurement unit configured to measure one or more capacitances on the sensor plates, and a processing unit configured to process the measured capacitances, the method comprising:
the measurement unit concurrently measures capacitances on mutually different subsets of the set of sensor plates, wherein each mutually different subset of the set of sensor plates comprises (n−1) sensor plates, wherein n represents the number of sensor plates in the set of sensor plates, and wherein the measurement unit sequentially measures the capacitances on n mutually different subsets of the set of sensor plates, wherein each mutually different subset of the n mutually different subsets is a unique set of sensor plates;
the processing unit processes the concurrently measured capacitances to derive a capacitance on each one of the n individual sensor plates that are sequentially measured on the n mutually different subsets of the set of sensor plates;
wherein deriving a capacitance on each one of the n individual sensor plates from said concurrently measured capacitances comprises:
summing the capacitances of the n mutually different subsets; and
utilizing a gain factor of n−1 to calculate the capacitance of each one of the n individual sensor plates from said concurrently measured capacitances comprises.

14. A non-transitory computer readable medium with a computer program comprising non-transient instructions stored thereon, which, when executed, carry out or control the steps of the method of claim 13.

15. The method of claim 13, wherein n is a power of two plus one.

16. The method of claim 15, wherein the processing unit is configured to perform binary shift operations to derive a capacitance on one or more individual sensor plates from said concurrently measured capacitances.

17. The method of claim 13, utilizing a gain factor of n−1 to calculate the capacitance of each one of the n individual sensor plates from said concurrently measured capacitances comprises:

multiplying the sum of capacitances of one of the n mutually different subsets by n−1 to generate a subtraction value, wherein the particular one of the n mutually different subsets that is used to generate the subtraction value does not include a capacitance measurement from a first sensor plate;

obtaining the difference between the sum of the capacitance of the n mutually different subsets and the subtraction value; and dividing the difference between the sum of the capacitance of the n mutually different subsets and the subtraction value by n−1 to obtain the capacitance of the first sensor plate.

* * * * *